United States Patent [19]

Tsuji

[11] 4,453,813
[45] Jun. 12, 1984

[54] PHOTOMETRIC DEVICE FOR SINGLE-LENS REFLEX CAMERA

[75] Inventor: Sadahiko Tsuji, Kanagawa, Japan

[73] Assignee: Canon Kabushiki Kaisha, Tokyo, Japan

[21] Appl. No.: 358,295

[22] Filed: Mar. 15, 1982

[30] Foreign Application Priority Data

Mar. 24, 1981 [JP] Japan .................. 56-42771

[51] Int. Cl.³ ............................................. G03B 7/00
[52] U.S. Cl. .................................................. 354/480
[58] Field of Search ............................ 354/23 R, 59

[56] References Cited

U.S. PATENT DOCUMENTS 3,185,052  5/1965  Baron ..................................... 354/59
3,205,796  9/1965  Lieser .................................... 354/59
4,110,765  8/1978  Miyata et al. ......................... 354/59

FOREIGN PATENT DOCUMENTS 2918647 11/1980 Fed. Rep. of Germany .... 354/23 R

Primary Examiner—Russell E. Adams
Attorney, Agent, or Firm—Toren, McGeady and Stanger

[57] ABSTRACT

The disclosed photometric device measures light from an image formed on a focal plane and permits alterations in the portion of light distribution measured. The device has a hood at least partially disposed before a light receiving element which receives a light from the image formed on the focal plane. The light distribution measurement can be changed by moving the hood back and forth relative to the light receiving element.

4 Claims, 3 Drawing Figures

PHOTOMETRIC DEVICE FOR SINGLE-LENS REFLEX CAMERA

BACKGROUND OF THE INVENTION

1. Field of the Invention

This invention relates to a photometric device for a photographic camera of the so-called TTL photometric type adapted for measuring a light coming from an object to be photographed and passing through a photograph taking optical system and more particularly to a photometric device arranged to permit alterations in the light distribution measured.

2. Description of the Prior Art

Heretofore, to vary the measurement of the light distribution in a TTL (through-the-lens) photometry arrangement, either a plurality of optical systems were selectively arranged in front of a light receiving element and selectively used, or a condenser lens was moved on the optical axis thereof to permit an operation called zooming. Such known arrangements include, for example, photometric devices of the type using a plurality of optical systems as proposed in Japenese Laid-Open Utility Model Application No. SHO 53-121833, Japanese Laid-Open Patent Application No. SHO 53-98821 and Japanese Patent Publication No. SHO 47-49610. However, the use of a plurality of optical systems within a camera body is not desirable because they occupy considerable space. Besides, such an arrangement has limited capability in respect to the form of the range of measuring light distribution and thus generally does not permit arbitrary alteration of measuring light distribution.

SUMMARY OF THE INVENTION

It is a general object of the invention to provide a photometric device for a camera which obviates the abovementioned shortcomings of the conventional devices and permits varied measuring light distribution from the same photometric device.

To attain this object, the device according to the invention is provided with a hood which is disposed in front of a light receiving element receiving a light flux coming from the image formed on an image plane to represent an object to be photographed. The hood is made movable back and forth relative to the light receiving element to partly restrict the light coming from the image of the object.

The object and features of the invention will become apparent from the following description of an embodiment thereof taken in connection with the accompanying drawings.

DETAILED DESCRIPTION OF PREFERRED EMBODIMENT

Figure 1:
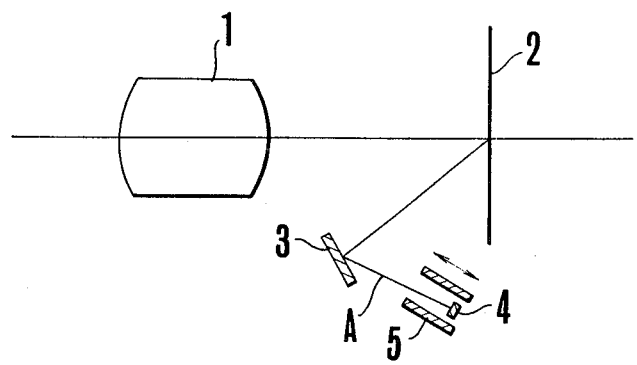
FIG. 1 is a schematic illustration of the optical arrangement of an embodiment of the invention.

Referring to FIG. 1 which shows an embodiment of the invention, there are provided a photograph taking optical system 1; a film surface 2; a mirror 3 which is arranged if necessary; a light receiving element 4; and a hood 5 of a tubular or square cylindrical shape. The hood 5 is arranged to be movable along a photometric optical axis A, for example, in the directions of arrows as shown in FIG. 1.

With the embodiment arranged as described above, light from an object to be photographed coming through the photograph taking optical system 1 is imaged on the film surface 2. Then, diffused light is emitted from the film surface. A portion of the diffused light can be eclipsed by the hood 5 and another portion of diffused light can be received by the element 4. The proportion of the eclipsed light to the received light can be changed by moving the hood 5 back and forth along the photometric optical axis A. In other words, variations of the position of the hood 5 in relation to the light receiving element 4 enables the photographer to continuously change the measured portion of the light distribution on the film surface. The reason for this can be understood from the illustrations of FIGS. 2 and 3.

Figure 2:
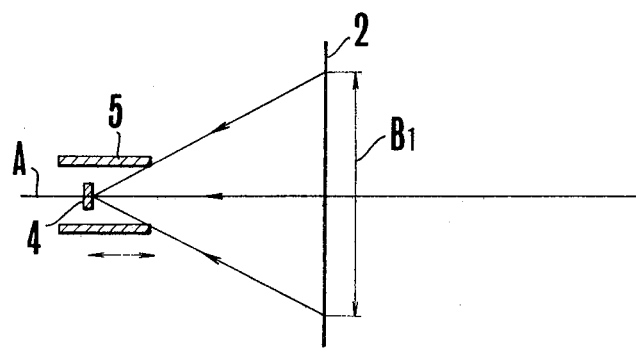
FIGS. 2 and 3 are schematic illustrations of the measuring light distribution of the embodiment.
Figure 3:
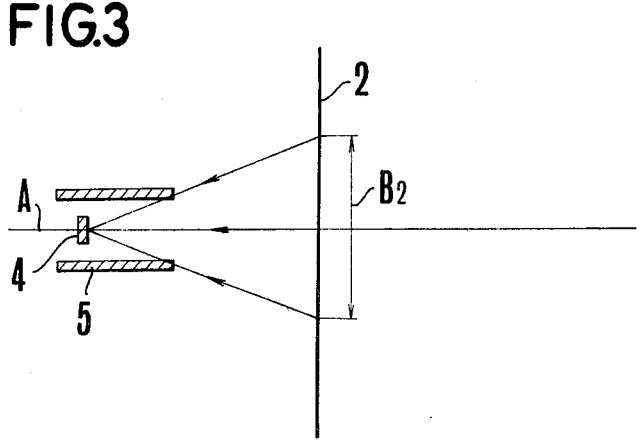

In FIGS. 2 and 3 which illustrate different measuring light distribution, the mirror 3 is omitted for the sake of simplification of the illustration. With the light receiving element 4 and the hood 5 arranged in positions as shown in FIG. 2, the light distribution measured over the film surface 2 covers a range B1.

Then, when the movable hood 5 is moved on the photometric optical axis in the direction of the arrow to bring it into the position shown in FIG. 3, the measuring light distribution becomes a range B2. This is called central area priority photometry. Thus, the measuring light distribution can be narrowed to put emphasis on the middle part of a picture in carrying out a light measuring operation. Since the position of the movable hood 5 is continuously variable, the measuring light distribution also can be continuously altered.

Further, the measuring light distribution over the film surface can be altered as desired by varying the position of the hood 5 in a direction perpendicular to the photometric optical axis A. The varying operation on the hood 5 can be facilitated by providing a pin on the outside of the camera and by moving the pin.

In this particular embodiment, the measuring light distribution is altered by moving the hood 5. However, the present invention is not limited to this arrangement and it is to be understood that the same effect is attainable in accordance with the invention by making the light receiving element 4 movable and the hood 5 stationary or by making both of them movable.

Further, while the embodiment of the invention has been described to measure the light on the film surface, the invention is not only applicable to the film surface light measurement but also applicable in the same manner to the general arrangement of measuring a light on the focal plane of a single-lens reflex camera.

As described in the foregoing, the photometric device according to the invention enables the photographer to continuously vary the measuring light distribution over the film surface. Therefore, it is an advantage of the invention that the device enables the photographer to selectively make averaged light measurements, make light measurements placing emphasis on the central area thereof or make mixed light measurements, so that a photometric operation can be accomplished in a satisfactory manner.

What is claimed is:

1. A photometric device for a photographic camera which allows photometry of light reflected from a film surface and comprises:
    photometric means;

hood means for guiding light over a set photometric range from the light reflected from the film surface toward said photometric means;

said hood means being formed in a tubular shape; and said hood means being supported to be freely movable along a direction in which said light reflected from the film surface comes into the hood means, so that the photometric range of the device is variable relative to the film surface.

2. A device according to claim 1, in which said hood means form an open end through which the light reflected from the film surface enter and the relationship between the open end and the photometric means varies depending on movement of the hood means so that the hood means can make the photometric range variable relative to the film surface.

3. A camera optical system, comprising:
an objective lens;
means defining an imaging plane in the path of light from the objective lens;
photometric means arranged to have light from the imaging plane incident thereon;
hood means for excluding a portion of the light reflected from the image plane to said photometric means;
said hood means being tubular;
said hood means being supported to be freely movable along the direction of light reflected from the imaging plane toward said photometric means so as to vary the amount of reflected light excluded by said hood means and vary area of the imaging plane from which reflected light is received by said photometric means.

4. A device as in claim 3, wherein said hood means surrounds said photometric means.

* * * * *